US008599803B1

(12) United States Patent
Zhang et al.

(10) Patent No.: US 8,599,803 B1
(45) Date of Patent: Dec. 3, 2013

(54) OPEN LOOP MULTIPLE ACCESS FOR WLAN

(75) Inventors: Hongyuan Zhang, Fremont, CA (US);
Rohit U. Nabar, Sunnyvale, CA (US);
Hui-Ling Lou, Sunnyvale, CA (US);
Sudhir Srinivasa, Sunnyvale, CA (US);
Arul Durai Murugan Palanivelu,
Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 763 days.

(21) Appl. No.: 12/772,783

(22) Filed: May 3, 2010

Related U.S. Application Data

(60) Provisional application No. 61/174,930, filed on May 1, 2009.

(51) Int. Cl.
*H04Q 7/24* (2006.01)

(52) U.S. Cl.
USPC .......................................................... 370/338

(58) Field of Classification Search
None
See application file for complete search history.

(56) References Cited

U.S. PATENT DOCUMENTS

| | | | | |
|---|---|---|---|---|
| 6,700,919 | B1 * | 3/2004 | Papasakellariou | 375/130 |
| 7,418,050 | B1 * | 8/2008 | Gardner et al. | 375/265 |
| 2003/0035491 | A1 * | 2/2003 | Walton et al. | 375/267 |
| 2004/0136349 | A1 * | 7/2004 | Walton et al. | 370/338 |
| 2005/0053164 | A1 * | 3/2005 | Catreux et al. | 375/260 |
| 2006/0193391 | A1 * | 8/2006 | Borran et al. | 375/260 |
| 2007/0121750 | A1 * | 5/2007 | Shirakata et al. | 375/267 |
| 2007/0143071 | A1 * | 6/2007 | Delargy | 702/177 |
| 2007/0258354 | A1 * | 11/2007 | Rooyen et al. | 370/208 |
| 2008/0070542 | A1 * | 3/2008 | Li et al. | 455/403 |
| 2008/0107196 | A1 * | 5/2008 | Won | 375/260 |
| 2008/0130538 | A1 * | 6/2008 | Raissinia et al. | 370/310 |
| 2008/0267138 | A1 * | 10/2008 | Walton et al. | 370/336 |
| 2009/0022093 | A1 | 1/2009 | Nabar et al. | |
| 2009/0022128 | A1 | 1/2009 | Nabar et al. | |
| 2009/0135944 | A1 * | 5/2009 | Dyer et al. | 375/267 |
| 2009/0135966 | A1 * | 5/2009 | Fischer et al. | 375/341 |
| 2009/0175214 | A1 * | 7/2009 | Sfar et al. | 370/315 |
| 2009/0327835 | A1 * | 12/2009 | Oteri et al. | 714/758 |
| 2011/0110353 | A1 * | 5/2011 | Hansen et al. | 370/338 |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

(Continued)

*Primary Examiner* — Hassan Phillips
*Assistant Examiner* — Prenell Jones

(57) ABSTRACT

In a method for transmitting information in a wireless local area network (WLAN), a plurality of different data streams corresponding to a plurality of different devices are orthogonally multiplexed onto a single symbol stream without using channel state information corresponding to a plurality of channels between a transmitting device and the plurality of different devices. One or more transmit streams are generated using the single symbol stream.

20 Claims, 11 Drawing Sheets

(56) References Cited

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

U.S. Appl. No. 12/730,651, filed Mar. 24, 2010, Zhang et al.

* cited by examiner

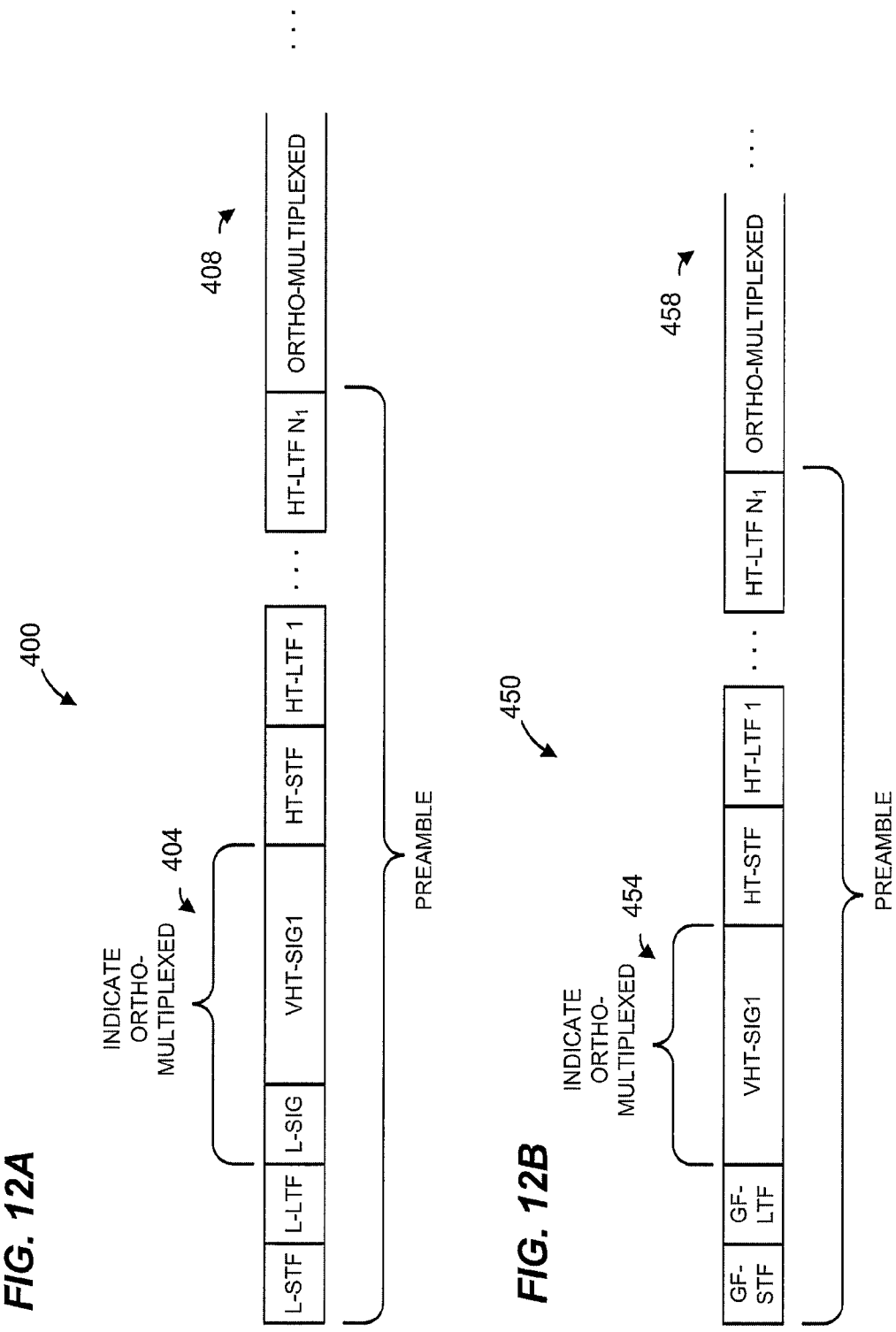

OPEN LOOP MULTIPLE ACCESS FOR WLAN

CROSS-REFERENCE TO RELATED APPLICATION

This disclosure claims the benefit of U.S. Provisional Patent Application No. 61/174,930, entitled "Open Loop SDMA, and its Applications in WLAN," which was filed on May 1, 2009, the entire disclosure of which is hereby incorporated by reference herein.

FIELD OF THE DISCLOSURE

The present disclosure relates generally to communication networks and, more particularly, to wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client devices. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps.

These WLANs operate in either a unicast mode or a multicast mode. In the unicast mode, the AP transmits information to one client device at a time. In the multicast mode, the same information is transmitted to a group of client devices concurrently.

SUMMARY

In one embodiment, a method for transmitting information in a wireless local area network (WLAN) includes orthogonally multiplexing a plurality of different data streams corresponding to a plurality of different devices onto a single symbol stream without using channel state information corresponding to a plurality of channels between a transmitting device and the plurality of different devices. The method also includes generating one or more transmit streams using the single symbol stream.

In other embodiments, the method may include one or more of the following features. The method also includes transmitting the one or more transmit streams via a single carrier in at least one physical layer data unit, wherein each of the at last one physical layer data unit includes data from each of the different data streams modulated on the single carrier. The single carrier is a sub channel in an orthogonal frequency domain multiplexing (OFDM) signal. Orthogonally multiplexing the plurality of different data streams corresponding to the plurality of different devices onto the single symbol stream comprises utilizing a space time block code. Orthogonally multiplexing the plurality of different data streams corresponding to the plurality of different devices onto the single symbol stream comprises utilizing the Alamouti code to multiplex two different data streams corresponding to two different devices onto the single symbol stream. The method further includes transmitting to the plurality of devices data that indicates, for each of the plurality of devices, a corresponding ordering of data for the device on the single symbol stream. Orthogonally multiplexing the plurality of different data streams corresponding to the plurality of different devices onto the single symbol stream comprises mapping bits corresponding to at least two different data streams into a single quadrature amplitude modulation (QAM) constellation point. The method further includes transmitting to the plurality of devices data that indicates, for each of the plurality of devices, how one or more bits for the device are mapped to the QAM constellation point. Orthogonally multiplexing the plurality of different data streams corresponding to the plurality of different devices onto the single symbol stream comprises interleaving symbols corresponding to the plurality of different data streams in the single symbol stream. The method further includes transmitting to the plurality of devices data that indicates, for each of the plurality of devices, how data for the device is interleaved in the single transmit stream. Orthogonally multiplexing the plurality of different data streams corresponding to the plurality of different devices onto the single symbol stream comprises forming a plurality of media access control (MAC) layer protocol data units (MPDUs), each MPDU having a respective MAC header, wherein data for each device is included in a respective MPDU. At least a first physical layer data unit includes a plurality of MPDUs corresponding to different devices. The method further includes transmitting to the plurality of devices data that indicates the first physical layer data unit includes multiple MPDUs corresponding to different devices. The data that indicates the first physical layer data unit includes multiple MPDUs corresponding to different devices is included in a header of the first physical layer data unit.

In another embodiment, an apparatus comprises a wireless local area network (WLAN) physical layer (PHY) unit. The PHY unit is configured to orthogonally multiplex a plurality of different data streams corresponding to a plurality of different devices onto a single symbol stream without using channel state information corresponding to a plurality of channels between a transmitting device and the plurality of different devices. The PHY unit is also configured to generate one or more transmit streams using the single symbol stream.

In yet another embodiment, a method includes receiving a physical layer data unit that includes a plurality of different data streams corresponding to a plurality of different devices orthogonally multiplexed onto a single symbol stream without using channel state information corresponding to a plurality of channels between a transmitting device and the plurality of different devices. The method also includes receiving data that indicates how one data stream corresponding to one of the plurality of different devices is orthogonally multiplexed onto the single symbol stream, and utilizing the data that indicates how the one data stream is multiplexed onto the single symbol stream to decode data corresponding to one of the plurality of different devices in the physical layer data unit.

BRIEF DESCRIPTION OF THE DRAWINGS

FIG. 12A is a diagram of an example PHY data unit, according to an embodiment;

FIG. 12B is a diagram of another example PHY data unit, according to an embodiment;

DETAILED DESCRIPTION

In embodiments described below, a wireless network device such as an access point (AP) of a wireless local area network (WLAN) transmits independent data streams to multiple client devices simultaneously. In particular, the wireless device orthogonally multiplexes data for the multiple clients onto a single symbol stream without using channel state information (CSI), and then transmits the multiplexed data (e.g., using orthogonal frequency division multiplexing (OFDM)). Similarly, in embodiments described below, a device that receives such an orthogonally multiplexed signal retrieves data intended for the device using knowledge of how the independent data streams were orthogonally multiplexed. In at least some embodiments, because multiplexing of the data for multiple clients is done without using CSI, such multiplexing does not require CSI feedback (i.e., open loop multiplexing) and therefore overhead is reduced.

Figure 1:
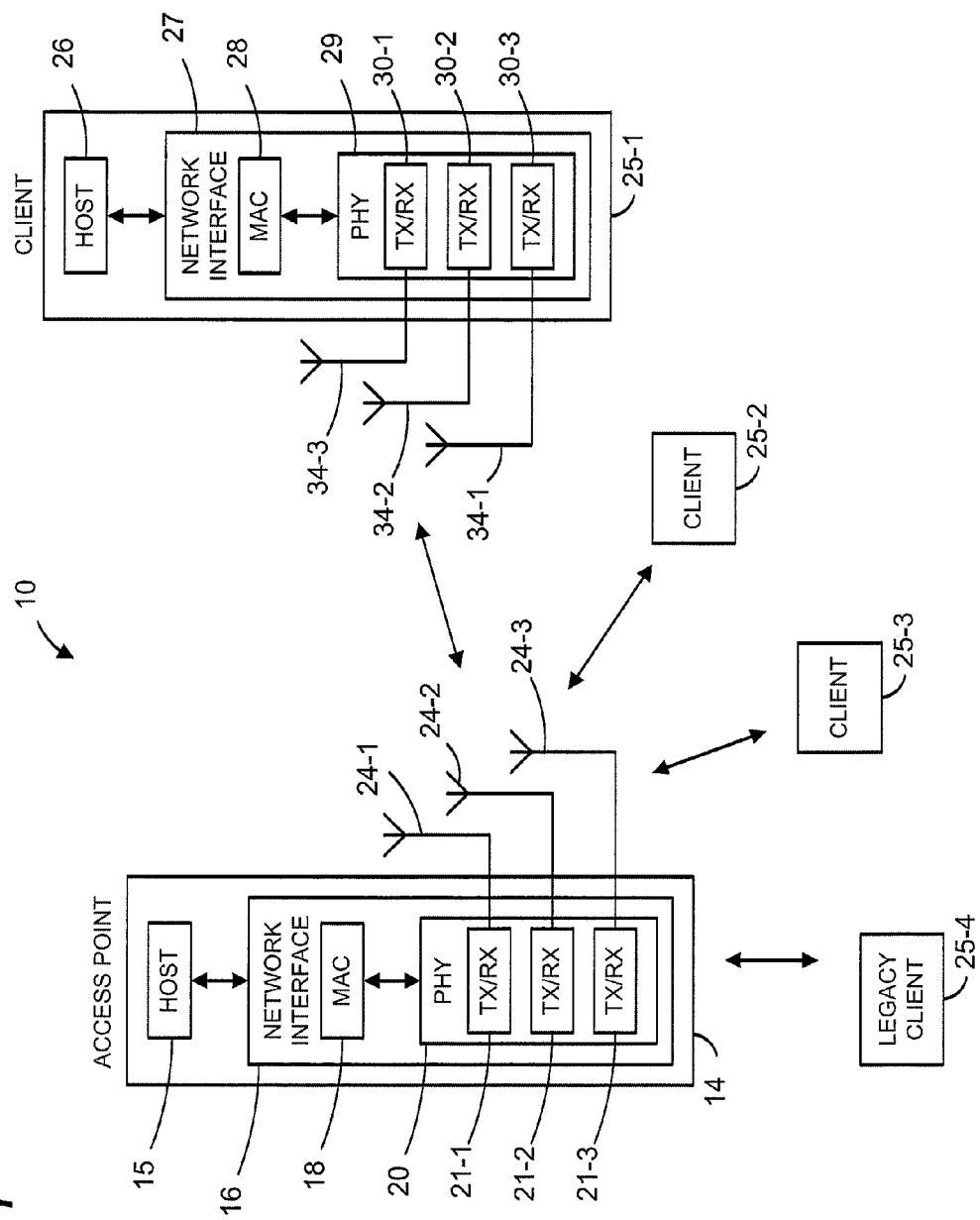
FIG. 1 a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In an embodiment, the AP 14 is configured to orthogonally multiplex data for multiple devices onto a single symbol stream without using CSI, and then transmit the multiplexed data (e.g., using OFDM) to the multiple client devices.

The WLAN 10 includes a plurality of client devices 25. Although four client devices 25 are illustrated in FIG. 1, the WLAN 10 can include different numbers (e.g., 1, 2, 3, 5, 6, etc.) of client devices 25 in various scenarios and embodiments. Two or more of the client devices 25 are configured to receive signals transmitted by the AP 14 on which independent data for the two or more client devices 25 is orthogonally multiplexed, and each such configured device 25 retrieves data from the single transmit stream that is intended for the client device 25.

A client device 25-1 includes a host processor 26 coupled to a network interface 27. The network interface 27 includes a MAC unit 28 and a PHY unit 29. The PHY unit 29 includes a plurality of transceivers 30, and the transceivers are coupled to a plurality of antennas 34. Although three transceivers 30 and three antennas 34 are illustrated in FIG. 1, the client device 25-1 can include different numbers (e.g., 1, 2, 4, 5, etc.) of transceivers 30 and antennas 34 in other embodiments. In an embodiment, the PHY unit 29 is configured to retrieve data for the client device 25-1 from multiplexed data for multiple client devices 25.

In an embodiment, one or both of the client devices 25-2 and 25-3 has a structure the same as or similar to the client device 25-1. In these embodiments, the client devices 25 structured like the client device 25-1 have the same or a different number of transceivers and antennas. For example, the client device 25-2 has only two transceivers and two antennas, according to an embodiment.

According to an embodiment, the client device 25-4 is a device (e.g., a legacy client device) that is not enabled to retrieve data for the client device 25-4 from multiplexed data for multiple client devices 25.

According to the IEEE 802.11a and the IEEE 802.11n Standards, different devices share the communication channel by utilizing a carrier sense, multiple access (CSMA) protocol. Generally speaking, CSMA, according to the IEEE 802.11a and the IEEE 802.11n Standards, specifies that a device that wishes to transmit should first check whether another device in the WLAN is already transmitting. If another device is transmitting, the device should wait for a time period and then again check again to see whether the communication channel is being used. If a device detects that the communication channel is not being used, the device then transmits using the channel. With CSMA, in other words, data that is for a particular device (i.e., not multicast data) can only be transmitted on the channel when no other data is being transmitted on the channel.

According to an embodiment, the AP 14 is enabled to transmit different data streams to different client devices 25 at the same time. In particular, the PHY unit 20 is configured to orthogonally multiplex data for multiple client devices 25 onto a single symbol stream without using CSI. One or more transmit signals are generated using the single symbol stream.

Figure 2:
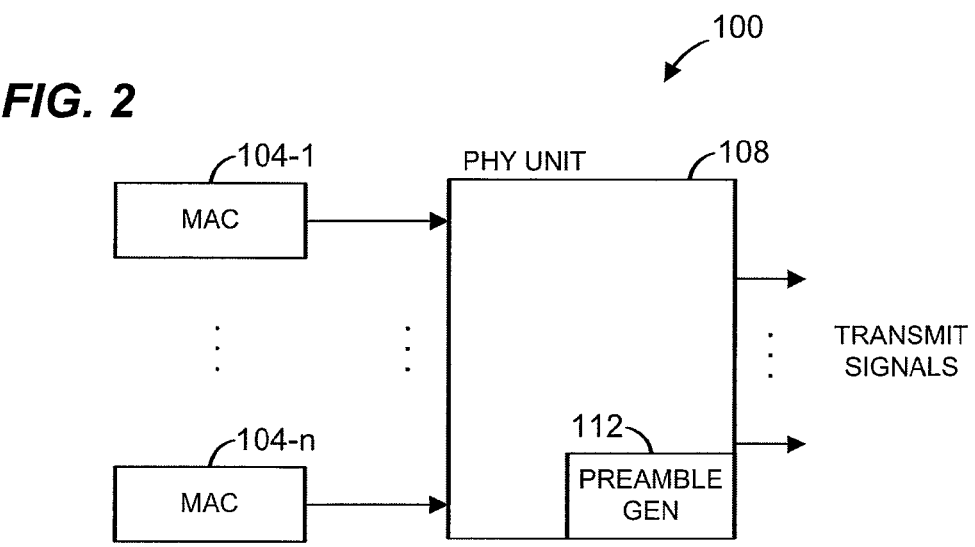
FIG. 2 is a block diagram of an example subsystem of a network interface, according to an embodiment.

FIG. 2 is a block diagram of an example subsystem 100 of a network interface that may be utilized in the network interface 16, according to an embodiment. The subsystem 100 is configured to orthogonally multiplex data for multiple client devices onto a single spatial stream without using CSI.

A plurality of media access control (MAC) sub-units 104-1 corresponding to different client devices (sometimes referred to herein as "users") provide independent data streams (i.e., the streams include different data) to a PHY unit 108. The PHY unit 108 is configured to orthogonally multiplex data for multiple client devices onto a single spatial stream without using CSI, and to generate one or more transmit signals using the single spatial stream. In some embodiments, the single spatial stream is one of a plurality of spatial streams generated by the PHY unit 108, and the PHY unit 108 also orthogonally multiplexes data for the multiple client devices on the one or more other spatial streams. In these embodiments, the PHY unit 108 generates the one or more transmit signals also using the one or more other spatial streams. The one or more transmit signals are provided to a transceiver (not shown) for transmission via one or more transmit antennas (not shown), according to an embodiment.

The PHY unit 108 includes a preamble generator 112 to generate a preamble of a PHY data unit. The preamble of the PHY data unit includes information that indicates whether the PHY data unit was generated using one or more spatial streams on each of which data for multiple client devices is orthogonally multiplexed. For example, a bit or set of bits in the preamble may indicate whether the PHY data unit was generated using one or more spatial streams on each of which data for multiple client devices is orthogonally multiplexed.

Figure 3:
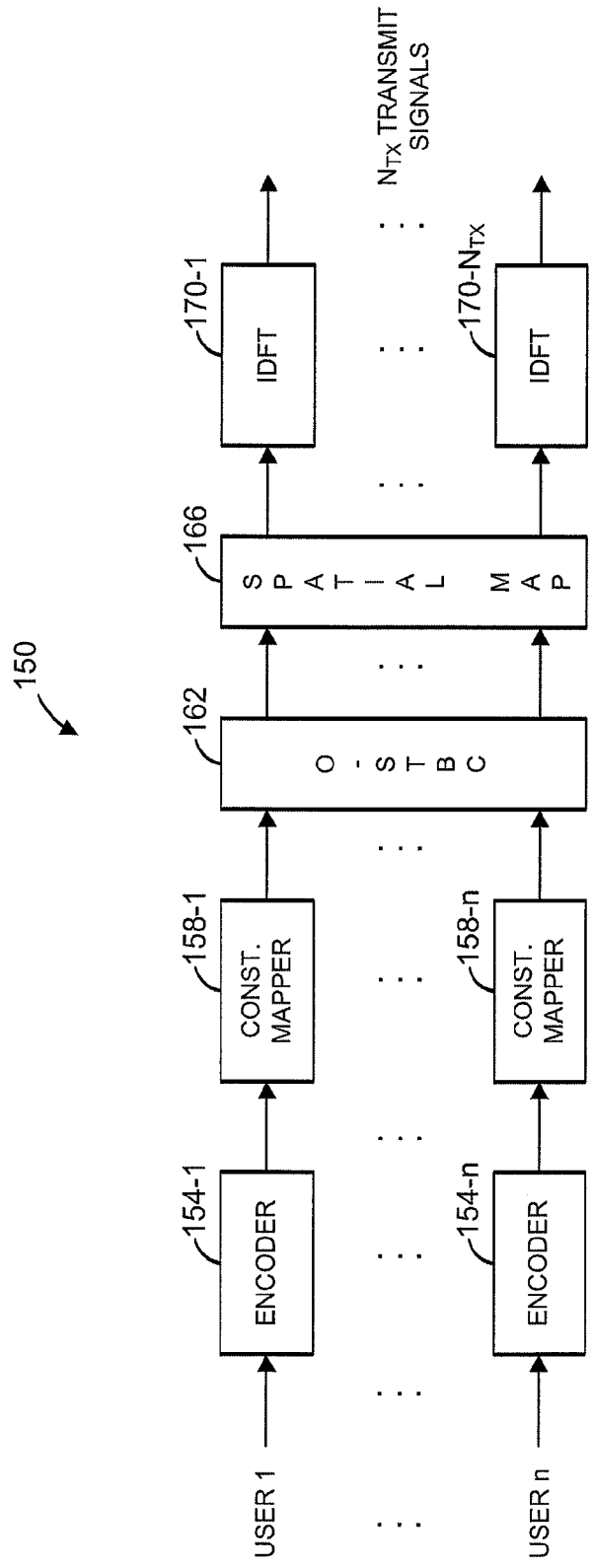
FIG. 3 is a block diagram of an example physical layer (PHY) unit, according to an embodiment.

FIG. 3 is a block diagram of an example PHY unit 150 that is utilized as the PHY unit 108 of FIG. 2, in an embodiment. The PHY unit 150 receives 1) independent data streams corresponding to n users. A plurality of encoders 154 separately encode each of then user data streams using one or more suitable forward error correction codes. A plurality of constellation mappers 108 separately map sets of one or more bits to constellation points (e.g., QAM constellation points) corresponding to a plurality of OFDM sub-channels to generate separate symbol streams corresponding to then user data streams.

An orthogonal space-time-block-coding (O-STBC) unit 162 orthogonally multiplexes symbols from the outputs of the constellation mappers 108 onto a plurality of STBC encoded spatial streams such that each of at least two of the output spatial streams of the O-STBC unit 162 includes data from multiple constellation mappers 158. In one embodiment, the number of output streams of the O-STBC unit 162 equals the number n user data streams.

A spatial mapping unit 166 maps the output streams of the O-STBC unit 162 into $N_{TX}$ transmit symbol streams. A plurality of inverse discrete Fourier transform units 170 receives the $N_{TX}$ transmit symbol streams and generates $N_{TX}$ transmit signals. In embodiments or scenarios in which spatial mapping is not utilized, the spatial mapping unit 166 does not apply spatial mapping and/or is omitted. In embodiments or scenarios in which spatial mapping is not utilized, the $N_{TX}$ transmit symbol streams are merely the spatial stream outputs of the O-STBC unit 162.

Figure 4:
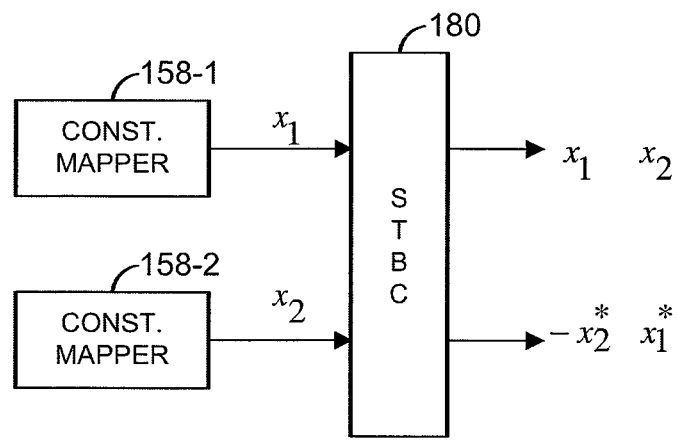
FIG. 4 is a block diagram of an example orthogonal space time block code unit, according to an embodiment.

FIG. 4 is a block diagram illustrating an example O-STBC unit 180 that is utilized as the O-STBC unit 162 of FIG. 3, according to an embodiment. In particular, the O-STBC unit 180 is utilized in scenarios in which the number n of user data streams is two. The O-STBC unit 180 receives symbols from two constellation mappers 108-1 and 108-2 and applies the Alamouti code to generate two output streams. For example, if the output of the constellation mapper 108-1 for an OFDM sub-channel is a constellation point $x_1$, and the output of the constellation mapper 108-2 for an OFDM sub-channel is a constellation point $x_2$, then the O-STBC unit 180 generates:

$$A = \begin{bmatrix} x_1 & x_2 \\ -x_2^* & x_1^* \end{bmatrix}$$

where the first column of A corresponds to a sub-channel in a first OFDM symbol, the second column of A corresponds to the sub-channel in a second OFDM symbol after the first OFDM symbol, the first row of A corresponds to a first spatial stream output of the O-STBC unit 180, and the second row of A corresponds to a second spatial stream output of the O-STBC unit 180.

Symbols from both of the constellation mappers 158 are multiplexed onto each output stream of the O-STBC unit 180, and each output stream of the O-STBC unit 180 includes symbols from each of the constellation mappers 158. In an embodiment utilizing OFDM, the transmission of $x_1$ and $x_2$ require two OFDM symbols.

In other embodiments, different orthogonal STBC codes than the Alamouti code are applied. For example, if the number of n of user data streams is three, a suitable STBC code that generates three output spatial streams is utilized. In another embodiment, if the number of n of user data streams is a 2M, then M O-STBC units 180 are utilized to generate 2M spatial streams.

More generally, if the number of n of user data streams is three or more, other suitable STBC codes are utilized. For real valued constellation points, full data rate as a single data stream continuous transmission can be achieved. On the other hand, for complex valued constellation points, the maximum data rate is lower than the full data rate if the number of spatial streams output by the O-STBC unit is greater than two. In an embodiment, for n user data streams, the effective rate is $$\frac{1}{n}$$

multiplied by the rate of a single user data stream utilizing STBC. For example, if there are two users, the effective data is ½ the rate of a single user utilizing STBC.

A receiver that receives a signal encoded using an O-STBC unit such as the O-STBC unit 162 of FIG. 3 and/or the O-STBC unit 180 of FIG. 4 can recover the data intended for the receiver using an STBC decoder. The receiver should know the ordering of its own symbols in the streams. After STBC decoding and recovery of symbols intended for the receiver, the receiver then performs demodulation and FEC decoding.

Figure 5:
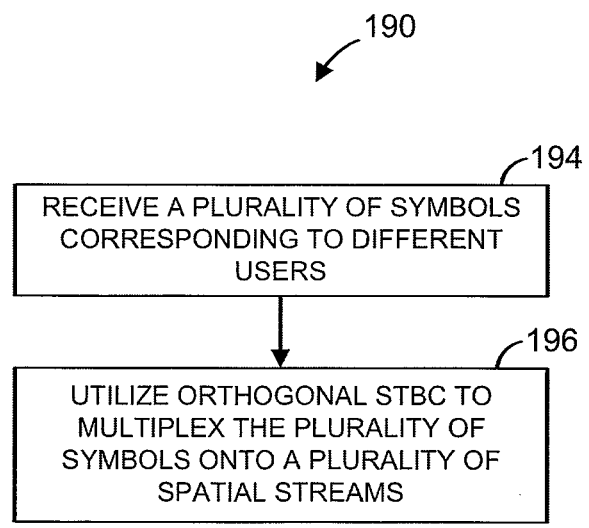
FIG. 5 is a flow diagram of an example method for multiplexing symbols corresponding to different data streams onto a plurality of spatial streams, according to another embodiment.

FIG. 5 is a block diagram of an example method 190 for orthogonally multiplexing a plurality symbol streams corresponding to a plurality of different client devices. In an embodiment, the method 190 is implemented by the O-STBC unit 162 of FIG. 3 and/or the example O-STBC unit 180 of FIG. 4. In other embodiments, the method 190 is implemented by another suitable O-STBC unit. FIG. 5 is discussed with reference to FIG. 4 for ease of explanation.

At block 194, a plurality of symbol streams corresponding to different client devices are received. For example, the plurality of symbol streams may correspond to the output of constellation mappers 158.

At block 196, an orthogonal STBC is utilized to multiplex the plurality of symbol streams onto a plurality of STBC encoded spatial streams such that each of at least two of the spatial streams includes data from multiple symbol streams received at block 194. In one embodiment, the number of output spatial streams of the O-STBC unit 162 equals a number n of symbol streams received at block 194.

Figure 6A:
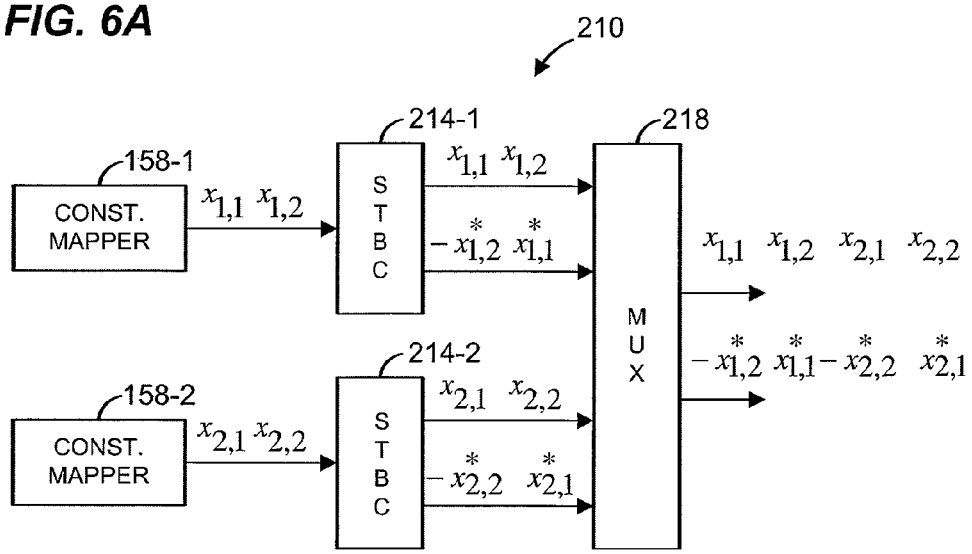
FIG. 6A is a block diagram of another example orthogonal space time block code unit, according to an embodiment.

FIG. 6A is a block diagram illustrating another example O-STBC unit 210 that is utilized as the O-STBC unit 162 of FIG. 3, according to another embodiment. In particular, the O-STBC unit 210 is utilized in scenarios in which the number n of user data streams is two. The O-STBC unit 210 includes two STBC encoders 214 and a multiplexer 218. The STBC unit 214-1 receives symbols from the constellation mapper 108-1 and applies the Alamouti code to generate two output streams. Similarly, the STBC unit 214-1 receives symbols from the constellation mapper 108-2 and applies the Alamouti code to generate two output streams.

For example, if two successive outputs of the constellation mapper 108-1 for an OFDM sub-channel are constellation points $x_{1,1}$ and $x_{1,2}$, then the STBC unit 214-1 generates:

$$A_1 = \begin{bmatrix} x_{1,1} & x_{1,2} \\ -x_{1,2}^* & x_{1,1}^* \end{bmatrix}$$

where the first column of $A_1$ corresponds to a sub-channel in a first OFDM symbol, the second column of $A_1$ corresponds to the sub-channel in a second OFDM symbol after the first OFDM symbol, the first row of $A_1$ corresponds to a first spatial stream output of the STBC unit 214-1, and the second row of $A_1$ corresponds to a second spatial stream output of the STBC unit 214-1.

If two successive outputs of the constellation mapper 108-2 for an OFDM sub-channel are constellation points $x_{2,1}$ and $x_{2,2}$, then the STBC unit 214-2 generates:

$$A_2 = \begin{bmatrix} x_{2,1} & x_{2,2} \\ -x_{2,2}^* & x_{2,1}^* \end{bmatrix}$$

where the first column of $A_2$ corresponds to a sub-channel in a first OFDM symbol, the second column of $A_2$ corresponds to the sub-channel in a second OFDM symbol after the first OFDM symbol, the first row of $A_2$ corresponds to a first spatial stream output of the STBC unit 214-2, and the second row of $A_2$ corresponds to a second spatial stream output of the STBC unit 214-2.

The multiplexer 218 multiplexes the outputs of the STBC units 214. In particular, the matrix $A_1$ is output by the multiplexer 218 and then the matrix $A_2$ is output by the multiplexer 218.

Figure 6B:
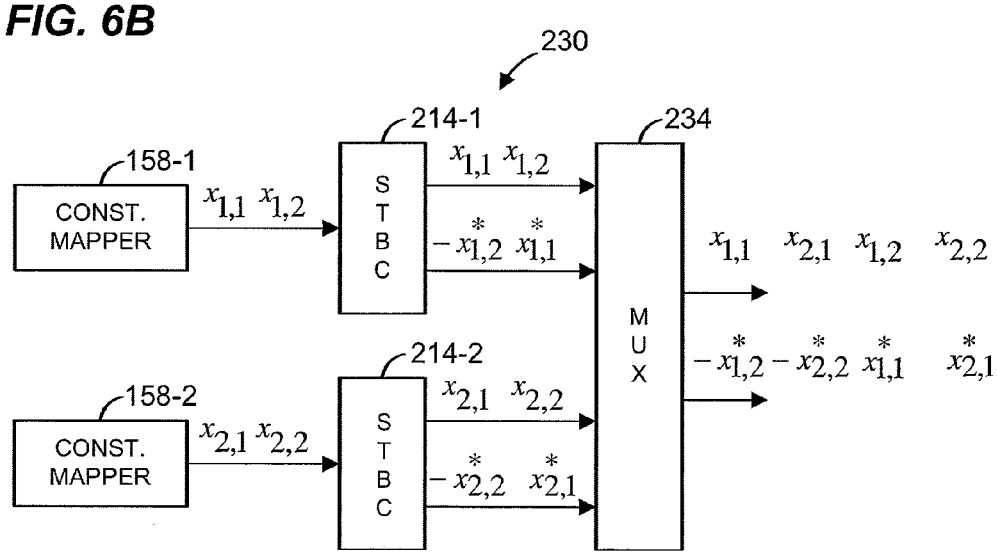
FIG. 6B is a block diagram of another example orthogonal space time block code unit, according to an embodiment.

FIG. 6B is a block diagram illustrating another example O-STBC unit 230 that is utilized as the O-STBC unit 162 of FIG. 3, according to another embodiment. In particular, the O-STBC unit 230 is utilized in scenarios in which the number n of user data streams is two. The O-STBC unit 230 is similar to the O-STBC unit 210 of FIG. 6A, and includes the two STBC encoders 214 and a multiplexer 234.

The multiplexer 234 multiplexes the outputs of the STBC units 214. In particular, the first column of matrix $A_1$ is output by the multiplexer 218, and then the first column of matrix $A_2$ is output by the multiplexer 218. Next, the second column of matrix $A_1$ is output by the multiplexer 218, and then the second column of matrix $A_2$ is output by the multiplexer 218.

In other embodiments, O-STBC units similar to those in FIGS. 6A and/or 6B are utilized, but different STBC codes than the Alamouti code are applied. For example, if the number of n of user data streams is three, a suitable STBC code that generates three output spatial streams is utilized. Additionally, a different suitable multiplexer is utilized. In another embodiment, if the number of n of user data streams is a 2M, then M O-STBC units 210 and/or 230 are utilized to generate 2M spatial streams.

A receiver that receives a signal encoded using an O-STBC unit such as the O-STBC unit 162 of FIG. 3, the O-STBC unit 210 of FIG. 6A, and/or the O-STBC unit 210 of FIG. 6B can recover the data intended for the receiver using an STBC decoder. The receiver should know the ordering of its own symbols in the streams. After STBC decoding and recovery of symbols intended for the receiver, the receiver than performs demodulation and FEC decoding.

Figure 7:
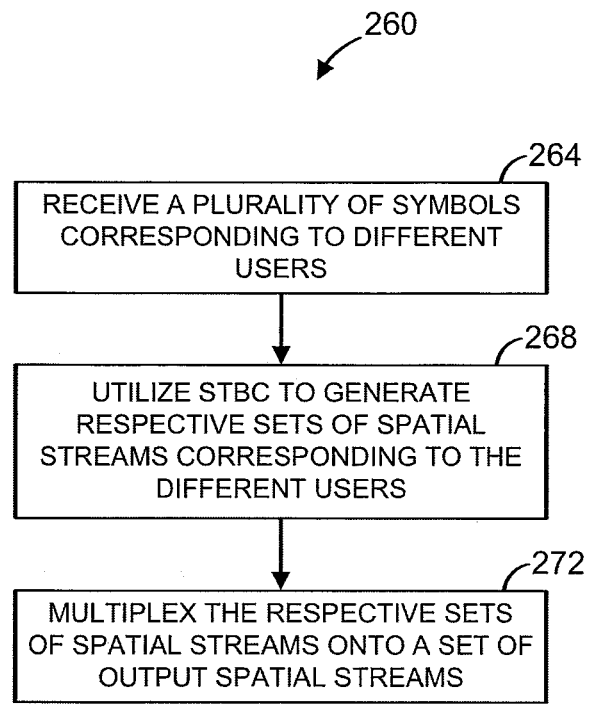
FIG. 7 is a flow diagram of another example method for multiplexing symbols corresponding to different data streams onto a plurality of spatial streams, according to another embodiment.

FIG. 7 is a block diagram of an example method 260 for orthogonally multiplexing a plurality symbol streams corresponding to a plurality of different client devices. In an embodiment, the method 260 is implemented by the O-STBC unit 162 of FIG. 3, the example O-STBC unit 210 of FIG. 6A, and/or the example O-STBC unit 230 of FIG. 6B. In other embodiments, the method 260 is implemented by another suitable O-STBC unit. FIG. 7 is discussed with reference to FIGS. 6A and 6B for ease of explanation.

At block 264, a plurality of symbol streams corresponding to different client devices are received. For example, the plurality of symbol streams may correspond to the output of constellation mappers 158.

At block 268, a respective set of spatial streams is generated from each constellation mapper 158 using STBC. For example, in FIGS. 6A and 6B, the STBC encoder 214-1 generates a set of spatial streams (e.g., $A_1$) using the output of the constellation mapper 158-1, and the STBC encoder 214-2 generates a set of spatial streams (e.g., $A_2$) using the output of the constellation mapper 158-2.

At block 272, the spatial streams of the STBC encoders 214 are multiplexed onto a set of output spatial streams such that each of at least two of the output spatial streams includes data from multiple symbol streams received at block 264. In two particular embodiments, the spatial streams of the STBC encoders 214 are multiplexed as described above with respect to FIGS. 6A and 6B.

The methods and apparatus described with respect to FIGS. 2-7 are utilized with other multiple access schemes, in some embodiments. For example, in various embodiments, one or more methods and apparatus described with respect to FIGS. 2-7 are combined with orthogonal frequency division multiple access (OFDMA) techniques described in U.S. patent application Ser. No. 12/730,651, entitled "OFDMA with Block Tone Assignment for WLAN," filed on Mar. 24, 2010, which is hereby incorporated herein in its entirety. For instance, in one embodiment, an AP utilizes a method and/or apparatus described with respect to one or more of FIGS. 2-7 to transmit data to a plurality of different devices in a first OFDM sub-channel block, whereas the AP simultaneously transmits data to only a single device in a second OFDM sub-channel block, i.e., the transmissions in the first and second OFDM sub-channel blocks overlap in time. In one embodiment, the transmissions in the first and second OFDM sub-channel blocks begin at the same time.

As another example, in various embodiments, one or more methods and apparatus described with respect to FIGS. 2-7 are utilized in combination with simultaneous downlink transmission (SDT) techniques described in U.S. patent application Ser. No. 12/175,526, entitled "Access Point with Simultaneous Downlink Transmission of Independent Data for Multiple Client Devices," filed on Jul. 18, 2008, which is hereby incorporated herein in its entirety. For instance, in one embodiment, an AP utilizes a method and/or apparatus described with respect to one or more of FIGS. 2-7 to transmit data to a first group of devices, whereas the AP utilizes SDT (also referred to as closed-loop simultaneous downlink multiple access (closed-loop SDMA)) to transmit data to a second group of devices. In this embodiment, the AP utilizes a first steering matrix to transmit data to the first group of devices, whereas the AP utilizes a set of second steering matrices to transmit data to the second group of devices. Each steering matrix in the set of second steering matrices is configured so that interference with other devices in the second group of devices and interference with devices in the first group of devices is avoided. In this embodiment, data is transmitted to the first group of users in a single PHY data unit (i.e., the single PHY data unit includes data for all devices in the first group of users), and the first steering matrix is configured to so that interference with devices in the second group of devices is avoided. Separate steering matrices for each of the devices in the first group of devices is not utilized for reducing interference between devices in the first group of devices because the orthogonal multiplexing techniques described above minimize interference between devices in the first group of devices.

Figure 8:
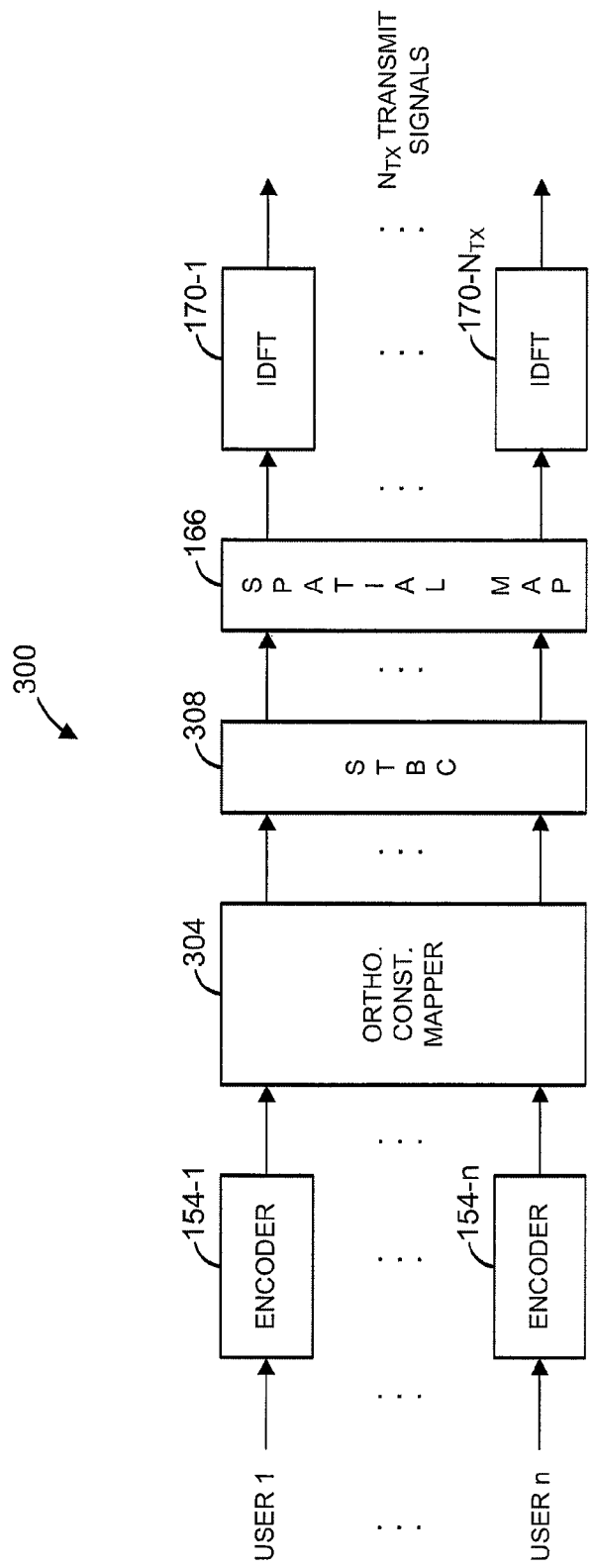
FIG. 8 is a block diagram of another example PHY unit, according to an embodiment.

FIG. 8 is a block diagram of another example PHY unit 300 that is utilized as the PHY unit 108 of FIG. 2, in an embodiment. The PHY unit 300 includes some of the same like-numbered elements as the PHY unit 150 of FIG. 3. The PHY unit 300 receives n independent data streams corresponding to n users. The plurality of encoders 154 separately encode each of the n user data streams using one or more suitable forward error correction codes. An orthogonal constellation mapper 304 maps sets of one or more bits from each of the n user data streams to constellation points (e.g., QAM constellation points) corresponding to a plurality of OFDM subchannels to generate one or more symbol streams. The orthogonal constellation mapper 304 orthogonally multiplexes data from the n user data streams onto the one or more symbol streams such that each of at least one of the output symbol streams of the orthogonal constellation mapper 304 includes data from multiple user data streams. In one embodiment, the orthogonal constellation mapper 304 maps a set of bits that includes at least one bit from each of the n independent data streams to $2^N$ possible constellation points, and generates a single symbol stream. In another embodiment, the orthogonal constellation mapper 304 maps a first set of bits that includes at least one bit from each of a first set of the n independent data streams to $2^N$ possible constellation points, and generates a first symbol stream. In this embodiment, the orthogonal constellation mapper 304 maps a second set of bits that includes at least one bit from each of a second set of the n independent data streams to $2^N$ possible constellation points, and generates a second symbol stream.

A space-time-block-coding (STBC) unit 308 applies a suitable STBC code to the one or more outputs of the constellation mapper 304 to generate a plurality of STBC encoded spatial streams. Suitable STBC codes applied by the STBC unit 308 include STBC codes currently known to those of ordinary skill in the art. In embodiments or scenarios in which STBC coding is not utilized, the STBC unit 308 does not apply an STBC code and/or is omitted.

The spatial mapping unit 166 maps the output streams of the STBC unit 308 into $N_{TX}$ transmit symbol streams. The plurality of inverse discrete Fourier transform units 170 receives the $N_{TX}$ transmit symbol streams and generates $N_{TX}$ transmit signals. In embodiments or scenarios in which spatial mapping is not utilized, the spatial mapping unit 166 does not apply spatial mapping and/or is omitted. In embodiments or scenarios in which spatial mapping is not utilized, the $N_{TX}$ transmit symbol streams are merely the spatial stream outputs of the STBC unit 308 (or the outputs of the orthogonal constellation mapper 304 if the STBC unit 308 is not utilized).

In some embodiments, the orthogonal constellation mapper 304 maps N bits of data to $2^N$ possible constellation points in a 2-dimensional signal (e.g., QAM modulation having an in-phase (I) and a quadrature (Q) component). In these embodiments, N/2 bits determine one of the $2^{N/2}$ possible values of I, and the other N/2 bits determine one of the $2^{N/2}$ possible values of Q. In one embodiment, $N/N_S$ bits for each of $N_S$ client devices are utilized together to map to a QAM constellation point. Any suitable mapping technique for mapping $N/N_S$ bits of each of $N_S$ client devices into a single constellation point in a set of $2^N$ possible constellation points can be utilized. For example, in one embodiment, $N/N_S$ bits for each of $N_S$ client devices are aggregated in a defined manner into a set of N bits (so that, at the client devices, each client device knows how to recover bits intended for that client device). Then, the set of N bits is mapped to one of $2^N$ QAM constellation points in a defined manner (so that, at the client devices, each client device knows how to recover bits intended for that client device). In this embodiment, the data rate to each client device is effectively $1/N_S$ times the rate of a single user transmission.

In one specific embodiment in which $N_S$ is two, N/2 bits for a first client device are mapped to N/2 possible I values, and N/2 bits for a second client device are mapped to N/2 possible Q values. In this embodiment, the data rate to each client device is effectively ½-th the rate of a single user transmission.

In some embodiments, two or more orthogonal constellation mappers 304 separately orthogonally map data streams to constellation points. For example, in one embodiment in which $N_S$ is four, a first constellation mapper maps N/2 bits for a first client device to N/2 possible I values, and maps N/2 bits for a second client device to N/2 possible Q values to generate a first symbol stream. In this embodiment, a second constellation mapper maps N/2 bits for a third client device to N/2 possible I values, and maps N/2 bits for a fourth client device to N/2 possible Q values to generate a second symbol stream.

Figure 9:
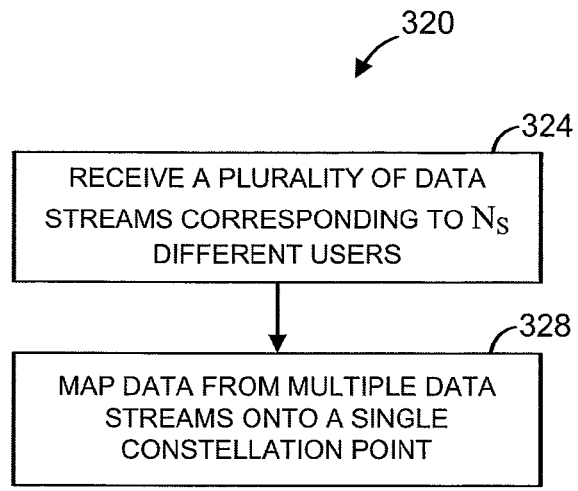
FIG. 9 is a flow diagram of an example method for mapping data corresponding to a plurality of data streams onto a single constellation point, according to an embodiment.

FIG. 9 is a flow diagram of an example method 320 for orthogonally multiplexing a plurality data streams corresponding to a plurality of different client devices. In an embodiment, the method 320 is implemented by the orthogonal constellation mapping unit 304 of FIG. 8. FIG. 9 is discussed with reference to FIG. 8 for ease of explanation.

At block 324, a plurality of data streams corresponding to $N_S$ different client devices are received. For example, the plurality of data streams may correspond to the output of the encoders 154.

At block 328, an orthogonal constellation mapper is utilized to map data from multiple data streams received at block 324 onto a single constellation point to generate a symbol stream. In an embodiment, at least one bit from each data stream received at block 324 is mapped onto a single constellation point. In an embodiment, the constellation mapper 304 maps into $2^N$ possible QAM constellation points and generates a single symbol stream. In one specific embodiment in which $N_S$ is two, N/2 bits for a first client device are mapped to N/2 possible I values, and N/2 bits for a second client device are mapped to N/2 possible Q values. In another embodiment, two or more constellation mappers separately map data from multiple data streams into respective constellation points and generate two or more symbol streams.

Figure 10:
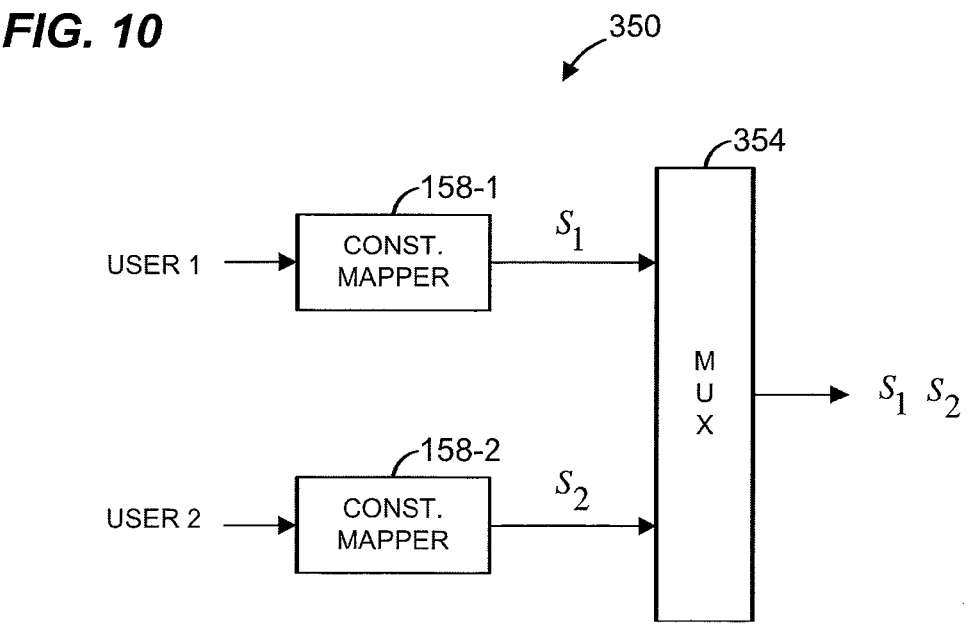
FIG. 10 is a block diagram of an example constellation mapper, according to an embodiment.

FIG. 10 is a block diagram of an example orthogonal constellation mapper 350 that may be utilized as or included in the orthogonal constellation mapper 304 of FIG. 8, according to another embodiment. The orthogonal constellation mapper 350 is for orthogonally mapping two user data streams into a single symbol stream. In other embodiments, a similar orthogonal constellation mapper 350 maps three or more user data streams into a single symbol stream. Additionally, in some embodiments, multiple orthogonal constellation mappers 350 can be utilized to separately map user data streams into a plurality of symbol streams.

The orthogonal constellation mapper 350 includes two constellation mappers 158. The constellation mapper 158-1 maps a first client data stream to constellation points to generate a first symbol stream ($S_1$). The constellation mapper 158-2 maps a second client data stream to constellation points to generate a second symbol stream ($S_2$). A multiplexer 354 multiplexes symbols from the constellation mapper 158-1 and the constellation mapper 158-2 onto a single symbol stream. In this way, the single symbol stream includes data from both the first client data stream and the second client data stream.

With the embodiment of FIG. 10, the data rate to each client device is effectively $1/N_S$ times the rate of a single user transmission. When $N_S$ is two, the data rate to each client device is effectively ½-th the rate of a single user transmission. In OFDM systems, constellation mapping is applied to all subcarriers corresponding to each of the user devices. Thus, different OFDM symbols correspond to data for different client devices. For example, in a first OFDM symbol, constellation points corresponding to a first client device are transmitted. In a second OFDM symbol, constellation points corresponding to a second client device are transmitted, and so on.

Figure 11:
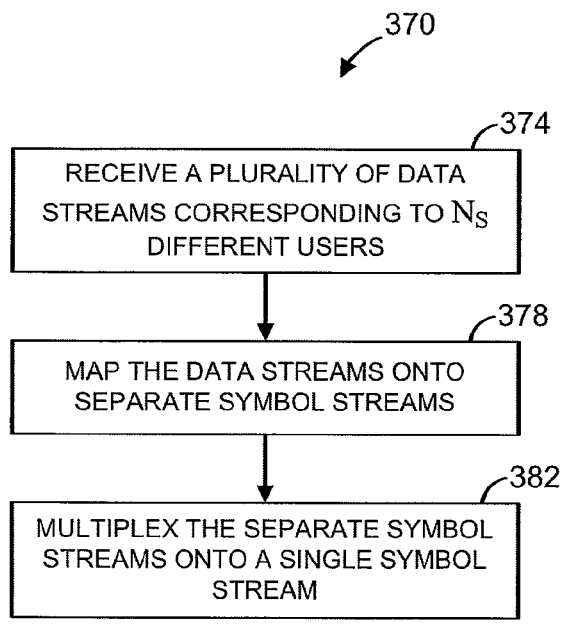
FIG. 11 is a flow diagram of an example method for multiplexing symbols corresponding to a plurality of data streams onto a single symbol stream, according to an embodiment.

FIG. 11 is a flow diagram of an example method 370 for orthogonally multiplexing a plurality symbol streams corresponding to a plurality of different client devices. In an embodiment, the method 370 is implemented by the orthogonal constellation mapping unit 304 of FIG. 8 and/or the orthogonal constellation mapping unit 350 of FIG. 10.

At block 374, a plurality of data streams corresponding to $N_S$ different client devices are received. For example, the plurality of data streams may correspond to the output of the encoders 154 (FIG. 8).

At block 378, each data stream is separately mapped to constellation points to generate a plurality of separate symbol streams. At block 382, the plurality of separate symbol streams are mapped to a single symbol stream.

A receiver that receives a signal encoded using an orthogonal constellation mapping unit such as the an orthogonal constellation mapping unit 304 of FIG. 8 and/or the an orthogonal constellation mapping unit 350 of FIG. 10 can recover the data intended for the receiver using a suitable demodulator unit that, using knowledge of the ordering of its own symbols in one or more symbol streams and/or knowing how data of the device is mapped to constellation points. After demodulation, the receiver performs FEC decoding to recover the user data.

With OFDM systems, the methods and apparatus described with respect to FIGS. 8-11 are applied across all sub-channels, in some embodiments. In other OFDM embodiments, the methods and apparatus described with respect to FIGS. 8-11 are applied across all some of the sub-channels. In some embodiments, the methods and apparatus described with respect to FIGS. 8-11 are utilized in combination with multiple-input, multiple-output (MIMO) techniques.

The methods and apparatus described with respect to FIGS. 8-11 are utilized with other multiple access schemes, in some embodiments. For example, in various embodiments, one or more methods and apparatus described with respect to FIGS. 8-11 are combined with OFDMA techniques described in U.S. patent application Ser. No. 12/730,651. For instance, in one embodiment, an AP utilizes a method and/or apparatus described with respect to one or more of FIGS. 8-11 to transmit data to a plurality of different devices in a first OFDM sub-channel block, whereas the AP simultaneously transmits data to only a single device in a second OFDM sub-channel block, i.e., the transmissions in the first and second OFDM sub-channel blocks overlap in time. In one embodiment, the transmissions in the first and second OFDM sub-channel blocks begin at the same time.

As another example, in various embodiments, one or more methods and apparatus described with respect to FIGS. 8-11 are utilized in combination with SDT techniques described in U.S. patent application Ser. No. 12/175,526. For instance, in one embodiment, an AP utilizes a method and/or apparatus described with respect to one or more of FIGS. 8-11 to transmit data to a first group of devices, whereas the AP utilizes SDT (also referred to as closed-loop SDMA) to transmit data to a second group of devices. In this embodiment, the AP utilizes a first steering matrix to transmit data to the first group of devices, whereas the AP utilizes a set of second steering matrices to transmit data to the second group of devices. Each steering matrix in the set of second steering matrices is configured so that interference with other devices in the second group of devices and interference with devices in the first group of devices is avoided. In this embodiment, data is transmitted to the first group of users in a single PHY data unit (i.e., the single PHY data unit includes data for all devices in the first group of users), and the first steering matrix is configured to so that interference with devices in the second group of devices is avoided. Separate steering matrices for each of the devices in the first group of devices is not utilized for reducing interference between devices in the first group of devices because the orthogonal multiplexing techniques described with respect to FIGS. 8-11 minimize interference between devices in the first group of devices.

As discussed above with reference to FIGS. 1-11, orthogonally multiplexed data corresponding to multiple client devices can be transmitted in a single PHY data unit. In some embodiments, the PHY data unit formats the same as or similar to PHY data unit formats specified in the IEEE 802.11n Standard are utilized. FIG. 12A is a diagram of an example PHY data unit format 400 that can be used for mixed-mode transmissions in a WLAN. With the example format 400, an orthogonal multiplexing technique such as described above with reference to FIGS. 1-11 is applied to each sub-channel in an OFDM system, according to some embodiments.

The PHY data unit 400 includes a preamble having a portion 404 that includes a field to indicate whether a data portion 408 includes orthogonally multiplexed data corresponding to multiple client devices, according to an embodiment.

FIG. 12B is a diagram of an example PHY data unit format 450 that can be used for Green Field transmissions in a WLAN. With the example format 460, an orthogonal multiplexing technique such as described above with reference to FIGS. 1-11 is applied to each sub-channel in an OFDM system, according to some embodiments.

The PHY data unit 450 includes a preamble having a portion 454 that includes a field to indicate whether a data portion 458 includes orthogonally multiplexed data corresponding to multiple client devices, according to an embodiment.

With the PHY data unit formats 400 and/or 450, a single modulation coding scheme (MCS) is utilized to transmit the data portion 408/458, according to an embodiment. In an embodiment, the single MCS is selected based on the worst channel among the channels corresponding to the plurality of client devices. In an embodiment, MAC level signaling is utilized to inform the different client devices of the ordering of orthogonal STBC or multiplexed symbols, and/or the mapping scheme for mapping different client data to constellation points in the data portion 408/458, depending on the particular embodiment. In another embodiment, the preamble omits the field that indicates whether the data portion 408/458 includes orthogonally multiplexed data corresponding to multiple client devices. For example, MAC level signaling may be utilized to signal that a PHY data unit with orthogonally multiplexed data for different client devices will be subsequently transmitted.

Figure 13:
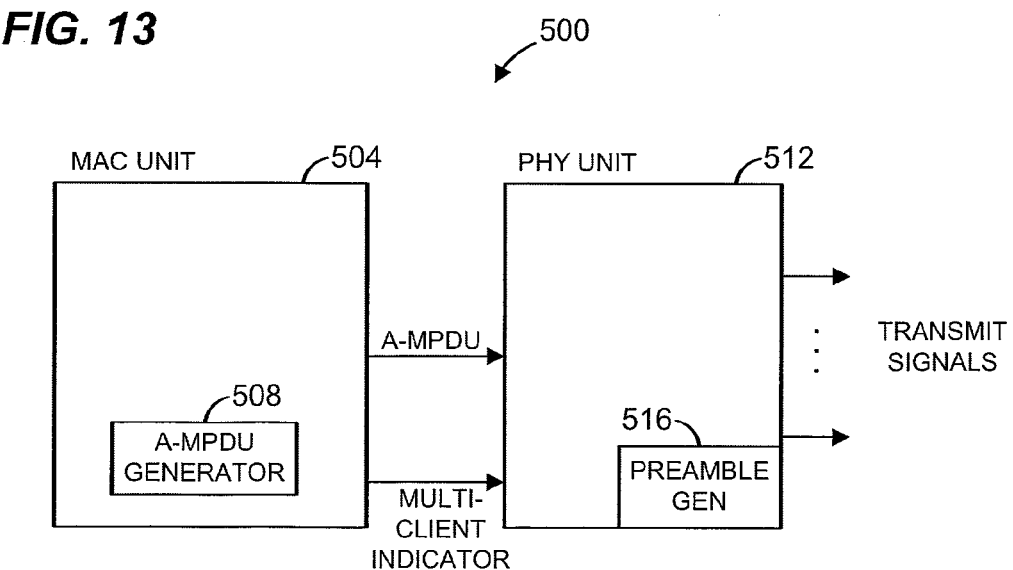
FIG. 13 is a block diagram of another example subsystem of a network interface, according to an embodiment.

FIG. 13 is a block diagram of an example subsystem 500 of a network interface that may be utilized in the network interface 16, according to an embodiment. The subsystem 500 is configured to orthogonally multiplex data for multiple client devices onto a single spatial stream without using CSI.

A MAC unit 504 generates separate MAC protocol data units (MPDUs) corresponding to different client devices and aggregates the MPDUs into an aggregated MPDU (A-MPDU) using an A-MPDU generator 508. Thus, the A-MPDU generated by the MAC unit 504 includes data from independent data streams (i.e., the streams include different data) corresponding to the different client devices. For example, different MPDUs in the A-MPDU have different MAC addresses corresponding to the different client devices. The MAC unit 504 also generates a signal that indicates whether the A-MPDU includes MPDUs for different client devices, in an embodiment.

The A-MPDU and the signal that indicates that the A-MPDU includes MPDUs for different client devices are provided to a PHY unit 512. The PHY unit 512 generates a PHY data unit that includes the A-MPDU. Because the A-MPDU includes different MPDUs having different MAC addresses, in an embodiment, and thus the client devices can discern data intended for themselves, the different client data in the PHY data unit is orthogonally multiplexed without using CSI.

The PHY unit 512 includes a preamble generator 516, according to an embodiment. The preamble generator 516 receives the indicator signal from the MAC unit 504 and sets an indicator field in a preamble of the PHY data unit to indicate that the PHY data unit includes an A-MPDU that includes different MPDUs for different client devices. In another embodiment, the preamble generator 516 does not set such an indicator field in the preamble of the PHY data unit. In this embodiment, MAC level signaling may be utilized to signal that a PHY data unit with orthogonally multiplexed data for different client devices will be subsequently transmitted.

The methods and apparatus described with respect to FIG. 13 are utilized with other multiple access schemes, in some embodiments. For example, in various embodiments, one or more methods and apparatus described with respect to FIG. 13 are combined with OFDMA techniques described in U.S. patent application Ser. No. 12/730,651. For instance, in one embodiment, an AP utilizes a method and/or apparatus described with respect to FIG. 13 to transmit data to a first plurality of different devices in a first OFDM sub-channel block, and the AP simultaneously utilizes a method and/or apparatus described with respect to FIG. 13 to transmit data to a second plurality of different devices in a second OFDM sub-channel block, i.e., the transmissions in the first and second OFDM sub-channel blocks overlap in time. In one embodiment, the transmissions in the first and second OFDM sub-channel blocks begin at the same time.

As another example, in various embodiments, one or more methods and apparatus described with respect to FIG. 13 are utilized in combination with SDT techniques described in U.S. patent application Ser. No. 12/175,526. For instance, in one embodiment, an AP utilizes a method and/or apparatus described with respect to FIG. 13 to transmit data to a first group of devices, whereas the AP utilizes SDT (also referred to as closed-loop SDMA) to transmit data to a second group of devices. In this embodiment, the AP utilizes a first steering matrix to transmit data to the first group of devices, whereas the AP utilizes a set of second steering matrices to transmit data to the second group of devices. Each steering matrix in the set of second steering matrices is configured so that interference with other devices in the second group of devices and interference with devices in the first group of devices is avoided. In this embodiment, data is transmitted to the first group of users in a single PHY data unit (i.e., the single PHY data unit includes data for all devices in the first group of users), and the first steering matrix is configured to so that interference with devices in the second group of devices is avoided. Separate steering matrices for each of the devices in the first group of devices is not utilized for reducing interference between devices in the first group of devices because the orthogonal multiplexing techniques described with respect to FIG. 13 minimize interference between devices in the first group of devices.

In any of the embodiments described above with respect to FIGS. 1-13, the different client devices to which data was transmitted using orthogonal multiplexing will respond to the AP with acknowledgments (ACKs) or negative acknowledgments (NACKs). Referring again to FIG. 1, in one embodiment, the MAC unit 18 of the AP schedules ACK/NACKs for the different client devices 25 to which orthogonally multiplexed data is transmitted in a single PHY data unit. In this embodiment, the MAC unit 18 causes indications of the times at which each client can transmit an ACK/NACK to be transmitted to the client devices.

Figure 14:
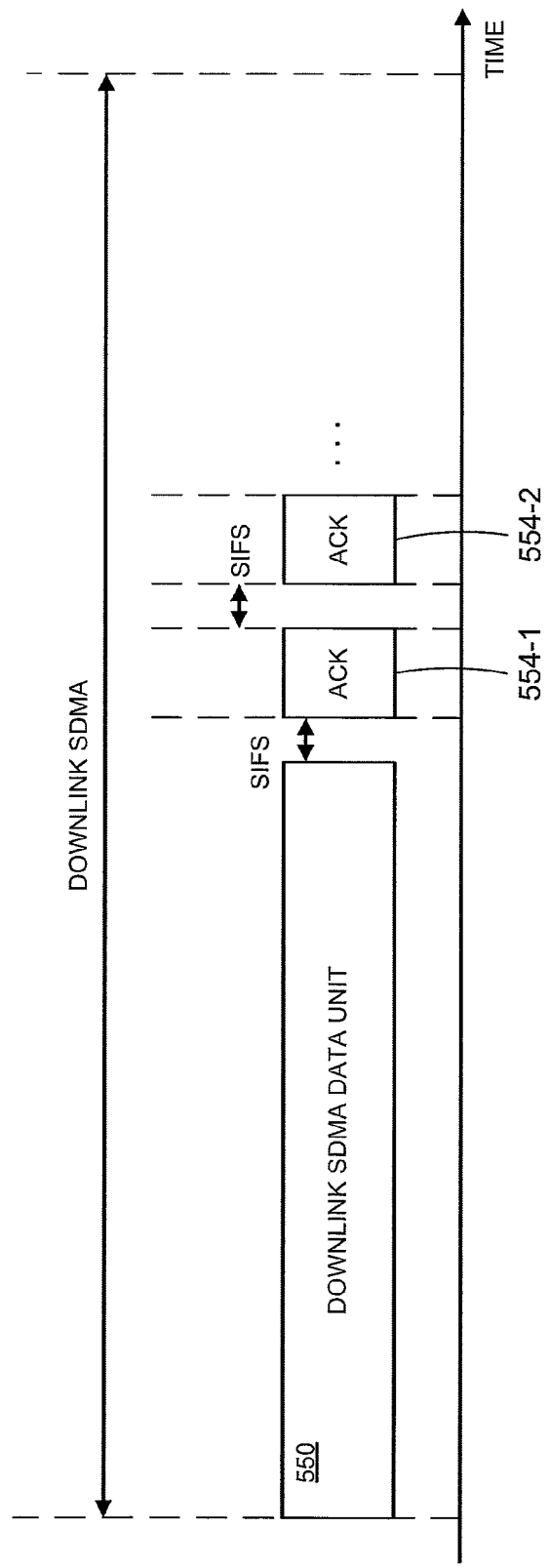
FIG. 14 is a diagram illustrating the transmission of a downlink data unit followed by a plurality of acknowledgments from different devices, according to an embodiment.

FIG. 14 is a timing diagram illustrating a reserved time interval for downlink SDMA. A plurality of time slots after the end of the downlink PHY data unit 550 are reserved for client devices to transmit ACK/NACKs 554.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting information in a wireless local area network (WLAN), the method comprising:
orthogonally multiplexing a plurality of different individual symbol streams corresponding to a plurality of different devices onto a single combined symbol stream, without using channel state information corresponding to a plurality of channels between a transmitting device and the plurality of different devices, so that every symbol of every individual symbol stream is included in the single combined symbol stream; and
generating one or more transmit streams using the single combined symbol stream.

2. A method according to claim 1, further comprising transmitting the one or more transmit streams via a single carrier in at least one physical layer data unit, wherein each of the at last one physical layer data unit includes data from each of the different individual symbol streams modulated on the single carrier.

3. A method according to claim 2, wherein the single carrier is a sub-channel in an orthogonal frequency domain multiplexing (OFDM) signal.

4. A method according to claim 1, wherein orthogonally multiplexing the plurality of different individual symbol streams corresponding to the plurality of different devices onto the single combined symbol stream comprises utilizing a space time block code.

5. A method according to claim 4, wherein orthogonally multiplexing the plurality of different individual symbol streams corresponding to the plurality of different devices onto the single combined symbol stream comprises utilizing the Alamouti code to multiplex two different individual symbol streams corresponding to two different devices onto the single combined symbol stream.

6. A method according to claim 4, further comprising transmitting to the plurality of devices data that indicates, for each device of the plurality of devices, a corresponding ordering of data for the device on the single combined symbol stream.

7. A method according to claim 1, wherein orthogonally multiplexing the plurality of different individual symbol streams corresponding to the plurality of different devices onto the single combined symbol stream comprises mapping bits corresponding to at least two different individual symbol streams into a single quadrature amplitude modulation (QAM) constellation point.

8. A method according to claim 7, further comprising transmitting to the plurality of devices data that indicates, for each device of the plurality of devices, how one or more bits for the device are mapped to the QAM constellation point.

9. A method according to claim 1, wherein orthogonally multiplexing the plurality of different individual symbol streams corresponding to the plurality of different devices onto the single combined symbol stream comprises interleaving symbols corresponding to the plurality of different individual symbol streams in the single symbol stream.

10. A method according to claim 1, further comprising transmitting to the plurality of devices data that indicates, for each device of the plurality of devices, how data for the device is interleaved in the single transmit stream.

11. A method according to claim 1, wherein orthogonally multiplexing the plurality of different individual symbol streams corresponding to the plurality of different devices onto the single combined symbol stream comprises forming a plurality of media access control (MAC) layer protocol data units (MPDUs), each MPDU having a respective MAC header, wherein data for each device is included in a respective MPDU,
wherein at least a first physical layer data unit includes a plurality of MPDUs corresponding to different devices.

12. A method according to claim 11, further comprising transmitting to the plurality of devices data that indicates the first physical layer data unit includes multiple MPDUs corresponding to different devices.

13. A method according to claim 12, wherein the data that indicates the first physical layer data unit includes multiple MPDUs corresponding to different devices is included in a header of the first physical layer data unit.

14. An apparatus, comprising:
a wireless local area network (WLAN) physical layer (PHY) unit configured to
orthogonally multiplex a plurality of different individual symbol streams corresponding to a plurality of different devices onto a single combined symbol stream, without using channel state information corresponding to a plurality of channels between a transmitting device and the plurality of different devices, so that every symbol of every individual symbol stream is included in the single combined symbol stream, and
generate one or more transmit streams using the single combined symbol stream.

15. An apparatus according to claim 14, wherein the PHY unit is configured to include data from each of the different individual symbol streams modulated on a single carrier in a single PHY data unit.

16. An apparatus according to claim 14, wherein the PHY unit includes a space time block code unit to orthogonally multiplex the plurality of different individual symbol streams corresponding to the plurality of different devices onto the single combined symbol stream.

17. An apparatus according to claim 14, wherein the PHY unit includes a constellation mapping unit to map bits corresponding to at least two different individual symbol streams into a single constellation point.

18. An apparatus according to claim 17, further comprising a media access control unit configured to cause data to be transmitted to the plurality of devices to indicate, for each device of the plurality of devices, how one or more bits for the device are mapped to the constellation point.

19. An apparatus according to claim 14, wherein the PHY unit includes:
a plurality of constellation mapping units to generate at least two symbol streams using at least two different individual symbol streams corresponding to the plurality of different devices; and
a multiplexer to multiplex the at least two symbol streams onto the single combined symbol stream.

20. A method, comprising:
receiving a physical layer data unit that includes a plurality of different individual symbol streams corresponding to a plurality of different devices orthogonally multiplexed onto a single combined symbol stream, without using channel state information corresponding to a plurality of channels between a transmitting device and the plurality of different devices, so that every symbol of every individual symbol stream is included in the single combined symbol stream;

receiving data that indicates how one individual symbol stream corresponding to one of the plurality of different devices is orthogonally multiplexed onto the single combined symbol stream; and utilizing the data that indicates how the one individual symbol stream is multiplexed onto the single combined symbol stream to decode data corresponding to one of the plurality of different devices in the physical layer data unit.

* * * * *